(No Model.)
H. F. BARTLETT.
CAN SCREW AND FAUCET.
No. 472,157. Patented Apr. 5, 1892.
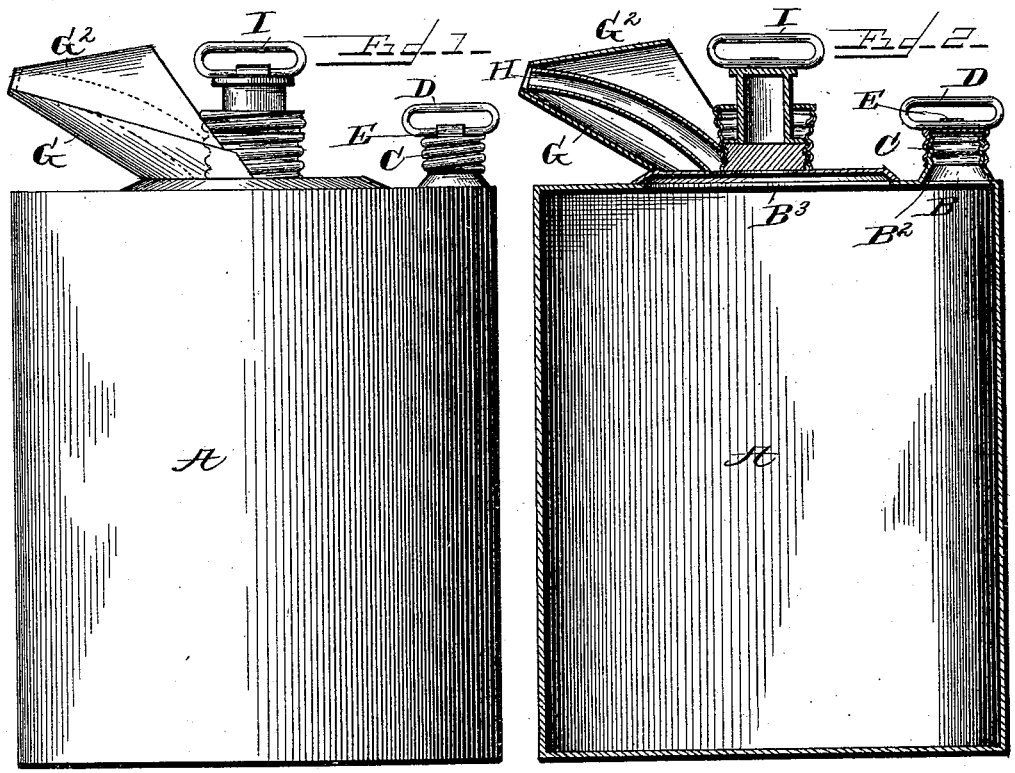
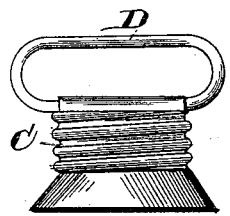
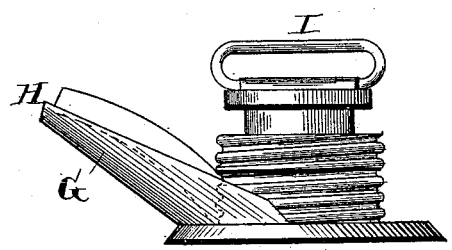
Witnesses
J. D. Kingsbery
D. G. Reinohl
Inventor
Henry F. Bartlett
By SA & SC Haseltine
his Attorneys

UNITED STATES PATENT OFFICE.

HENRY F. BARTLETT, OF SPRINGFIELD, MISSOURI.

CAN SCREW AND FAUCET.

SPECIFICATION forming part of Letters Patent No. 472,157, dated April 5, 1892.

Application filed April 3, 1891. Serial No. 387,567. (No model.)

*To all whom it may concern:*

Be it known that I, HENRY F. BARTLETT, a citizen of the United States, residing at Springfield, in the county of Greene and State of Missouri, have invented certain new and useful Improvements in Can Screws and Faucets; and I do hereby declare the following to be a full, clear, and exact description of the invention, such as will enable others skilled in the art to which it appertains to make and use the same.

My invention relates to improvements in metal screws for cans and faucets, and is also intended to improve the faucet hereinafter described in the manner specified, and illustrated in the accompanying drawings, in which—

Figure 1 is a view in elevation of the entire device. Fig. 2 is a sectional view of the same. Fig. 3 is a view of the metal screw. Fig. 4 is a detail of the faucet detached.

Similar letters of reference indicate corresponding parts in the several figures.

A represents an ordinary can of any desired size and shape.

B is an opening, having a projection $B^2$, provided with screw-threads. Said projection is provided with an ordinary cap C, to which I attach a handle or lever D. Said handle or lever is made any desired size and shape for forming a handle or thumb-piece to take hold of for screwing and unscrewing the cap-piece C. Said lever or handle D may be secured to the said cap by means of a plate E, which permits the handle or lever to raise up and down, but the same is preferably soldered to the cap, as shown in Fig. 3.

$B^3$ is another opening in the can, over which is placed a faucet. Said faucet is made as follows: In addition to the Vogel patent, dated May 11, 1886, which is a filler and faucet for cans and having a valve and a stem, the stem having a round cap to turn it for opening the valve. To this valve-cap I attach a handle I, as the old stem cannot be turned to open the valve when it is greased by use.

In operating the valve oil leaks out and makes the patent of Vogel lose oil, and to avoid this and to conduct this leakage into the vessel to be filled I add a catcher G for catching the oil which leaks or oozes out around the faucet and conducting it into the lamp or other receptacle at the end of the faucet-spout H. Said catcher is secured around the faucet, forming a trough, coming to a point at the end of the faucet-spout. Said trough may be covered by a piece $G^2$.

I is a handle or lever secured to the top of the faucet-screw for turning the same, made like the lever D, above described.

Having thus described my invention, what I claim as new, and desire to secure by Letters Patent, is—

In an oil-can, the combination, with the top, of a spout thereon communicating with the interior of the can, a fill and vent opening on the top, and a drip-trough surrounding the spout and partly surrounding the fill and vent opening to catch the drip from the same, substantially as described.

In testimony whereof I affix my signature in presence of two witnesses.

HENRY F. BARTLETT.

Witnesses:
J. W. FILLEY.
S. A. HASELTINE.